United States Patent [19]

McCullough

[11] Patent Number: 5,228,309
[45] Date of Patent: Jul. 20, 1993

[54] PORTABLE SELF-CONTAINED POWER AND COOLING SYSTEM

[75] Inventor: John E. McCullough, Carlisle, Mass.

[73] Assignee: Arthur D. Little, Inc., Cambridge, Mass.

[21] Appl. No.: 939,696

[22] Filed: Sep. 2, 1992

[51] Int. Cl.[5] .................................................. F25B 27/00
[52] U.S. Cl. ..................................... 62/323.1; 123/204
[58] Field of Search ............... 62/323.1; 123/204, 234, 123/235

[56] References Cited

U.S. PATENT DOCUMENTS

| | | | |
|---|---|---|---|
| 2,845,777 | 8/1958 | Nilsson et al. | 123/204 |
| 3,823,695 | 7/1974 | Swartz | 123/235 |
| 3,989,011 | 11/1976 | Takahashi | 123/204 |
| 4,098,256 | 7/1978 | Sieck | 123/204 X |
| 4,192,152 | 3/1980 | Armstrong et al. | 62/402 |
| 4,553,513 | 11/1985 | Miles et al. | 123/204 |
| 4,553,913 | 11/1985 | Morishita et al. | 418/55 |
| 4,677,949 | 7/1987 | Youtie | 123/235 |
| 5,094,205 | 3/1982 | Billheimer | 123/234 X |

Primary Examiner—William E. Tapolcai
Attorney, Agent, or Firm—Bacon & Thomas

[57] ABSTRACT

An integrated, self-contained portable power and cooling system includes a combustion generator and a scroll-type expander driven by combustion gas discharged from the gas generator, wherein the expander is connected in driving relationship to a scroll air compressor that provides compressed combustion air to the gas generator. Inlet air to the gas generator may be preheated by spent combustion gas discharged from the expander. A drive shaft driven by the expander is connected to a fuel pump, an electrical generator, and a refrigerant compressor. The scroll refrigerant compressor supplies refrigerant to a condenser evaporator cooling circuit for cooling a zone directly or indirectly via an auxiliary cooling loop in heat exchange relationship with the evaporator. The system has application in a man-portable system capable of cooling an individual in a high temperature environment and supplying electrical power.

22 Claims, 4 Drawing Sheets

FIG. 1

PORTABLE SELF-CONTAINED POWER AND COOLING SYSTEM

BACKGROUND OF THE INVENTION

The present invention pertains to an integrated, self-contained power and cooling system that is sized and configured so as to be readily portable by an individual. More specifically, the invention pertains to a cooling system which utilizes a scroll-type engine to drive a scroll type air conditioning refrigerant compressor in a conventional compressor-condenser-expander refrigeration circuit. The system is adapted to develop a supply of cooling fluid and a source of electrical power that can be used for various purposes. For instance, the integrated power and cooling system of the present invention can be used in combination with a personal vest through which a coolant cooled by the refrigerant can circulate to cool the user. Such a vest cooling arrangement can be used, for example, to cool a person subject to heat exhaustion, cool a soldier operating in a tropical environment or to maintain desired body temperature for individuals who suffer from a lack of sweat glands to the extent that their bodies cannot adequately provide the necessary cooling function on their own. The electrical power generated can be used to operate communication equipment.

SUMMARY OF THE INVENTION

The present invention provides an integrated, self-contained, power and cooling system including a combustion gas generator, a scroll-type expander which uses the combustion gas to drive a scroll type air conditioning refrigerant compressor within a conventional refrigeration circuit to develop an output cooling flow, and wherein the entire system is contained within a compact housing such that the system may be readily portable by a human individual. The combustion gas generator includes a combustion chamber which is systematically supplied with a charge that is ignited. The products of combustion ("combustion gases") are discharged through a scroll expander including relatively orbiting meshed scroll elements to thereby drive the expander in orbital motion. The expander connected to a scroll type air compressor that, in turn, compresses the ambient air and supplies this compressed air to the gas generator for use as combustion air. The scroll-type expander drives a scroll-type refrigerant compressor in a conventional compressor-expander refrigeration loop, which includes a refrigerant compressor, a condenser and an evaporator connected in series. A supplemental or indirect fluid coolant loop is provided in heat exchange relationship with the evaporator. This supplemental coolant loop can be connected to a personal vest or other garment to cool the user of the vest or garment by means of a small circulation pump or can provide a cooling output for other purposes.

The output of the expander is also used to drive a fuel pump, which is connected between a fuel tank and the gas generator, and an electrical generator/starter unit which is electrically connected to a battery. The compressor unit can be started initially by rotation of the output drive shaft by the generator/starter unit which is supplied with power by the battery. Alternatively, the compressor expander could be initially started by igniting a first charge within the gas generator. Once the system is operative, it can drive the generator/starter unit to provide electrical current to charge the battery, operate the circulating pump for the supplemental coolant loop, operate a cooling fan for the condenser in the refrigeration loop, and provide additional electrical power output.

In addition, a control unit is provided which is powered by the battery and which monitors the electrical and cooling requirements of the system as set by the user, including the supplemental cooling loop, in order to control the operation of the system. In one embodiment, the control unit is used to regulate the supply of fuel to the engine in order to regulate its output to indirectly control the cooling capacity of the system. In other embodiments, the output of the air conditioner and/or the output of the generator/starter unit can be controlled by the control unit.

Other objects, features and advantages of the invention shall become apparent from the following detailed description of a preferred embodiment thereof, taken in conjunction with the drawings wherein like reference characters refer to corresponding parts in the several figures.

DETAILED DESCRIPTION OF THE INVENTION

Figure 1:
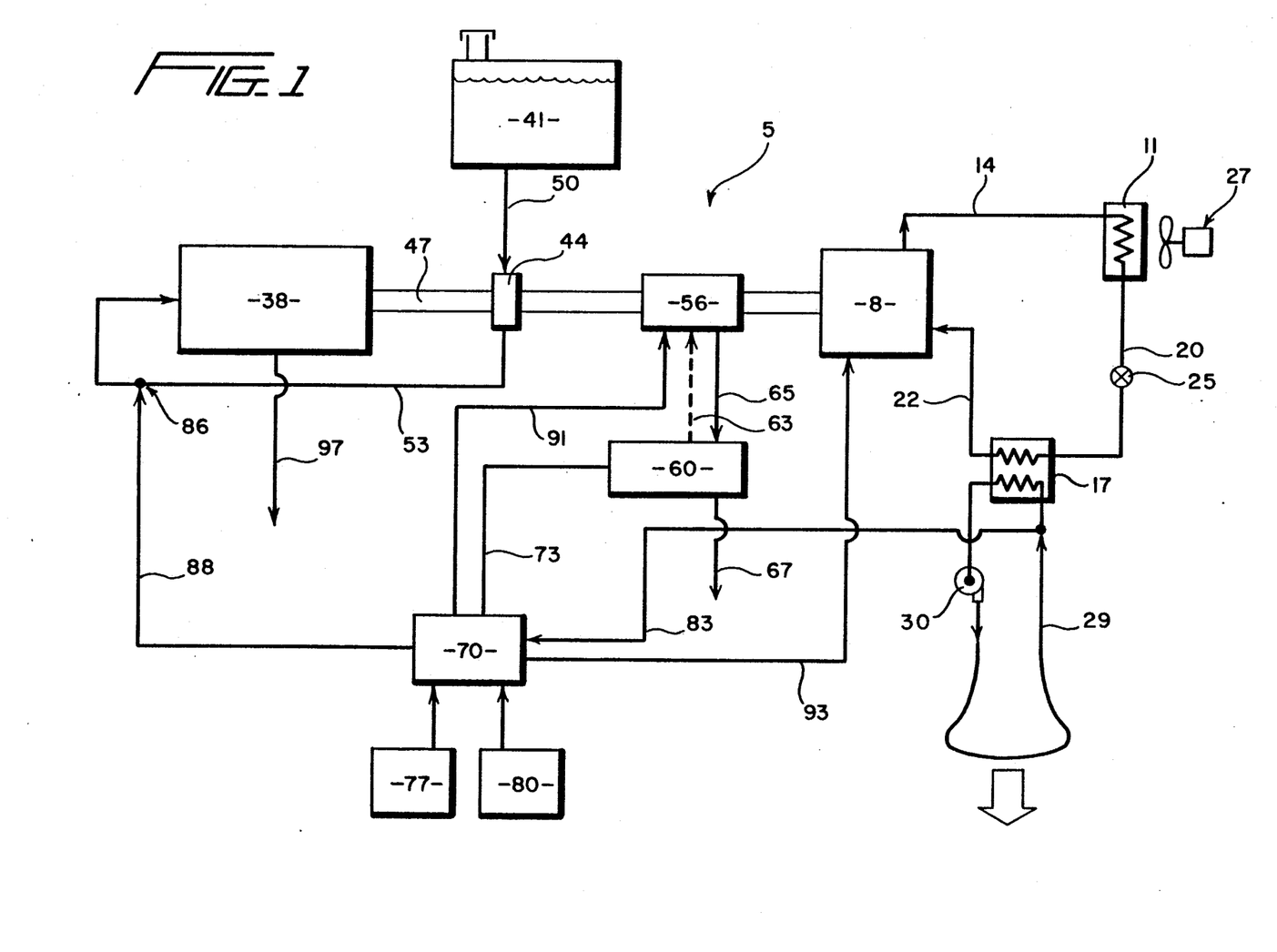
FIG. 1 is a general schematic diagram of the portable power and cooling system of the present invention.

The general configuration of the portable power and cooling system of the present invention will first be described with reference to FIG. 1 wherein the cooling system is generally indicated at 5. The cooling system utilizes a conventional refrigeration circuit including a refrigerant compressor 8, a condenser 11 which is interconnected to the compressor 8 through a refrigerant conduit 14, and an evaporator 17 which is connected to condenser 11 through a refrigerant conduit 20 and back to refrigerant compressor 8 through a conduit 22. This refrigerant circuit will normally include a refrigerant expansion valve 25, as is known in the art. In the preferred embodiment, a cooling fan unit 27 is located adjacent condenser 11 to provide a flow of cooling air in heat exchange relationship therewith. Cooling output from the system can be taken at the evaporator or via a heat exchange fluid medium in supplemental cooling loop 29 which is a coolant conduit in heat exchange relationship with evaporator 17. A circulating pump 30 is used to control the flow rate within the coolant conduit 29. At this point it should be noted that the supplemental cooling loop or conduit 29 can constitute either a liquid or air cooling system. As previously stated, the fluid coolant flowing through supplemental cooling loop 29 provides the output for cooling system 5 and may be adapted to circulate through a personal vest or garment (not shown) by circulating pump 30. Alternatively, of course, direct or indirect cooling effects could be obtained by convection or conduction at evaporator 17.

Power and cooling system 5 further includes a combustion gas generator/expander drive unit 38 (which may be referred to as the "engine" for the system) which is supplied with fuel, stored in a tank 41, by means of a fuel pump 44. Drive unit 38 includes an output shaft 47 which is drivingly connected to air conditioner refrigerant compressor 8. Fuel for combustion within drive unit 38 is drawn from tank 41 by fuel pump 44 through fuel line 50 and delivered via second fuel line 53 from fuel pump 44 to drive unit 38.

Also drivingly connected to output shaft 47 of drive unit 38 is an electrical generator/starter unit 56. Generator/starter unit 56 is electrically connected to a battery 60 through a first electrical power line 63 and a second electrical power line 65. In the preferred embodiment, generator/starter unit 56 can be used to both start drive unit 38 by receiving power from battery 60 through first electrical power line 63 to cause rotation of output shaft 47 of drive unit 38 to thereby cause a charge to form within a gas generator within unit 38 (as will be discussed more fully below) which can be ignited to start the continuous operation of the expander and then as an electrical generator wherein output shaft 47 of unit 38 drives generator/starter unit 56. In this mode of operation, generator/starter unit 56 functions to charge battery 60 through second electrical power line 65 and to provide an auxiliary electrical power output through line 67.

Power and cooling system 5 further includes a microprocessor control unit (CPU) 70 which is powered by means of battery 60 through line 73. Control unit 70 receives signals representative of the electrical requirements of the system inputted at 77 and system cooling requirements at 80. These electrical and cooling requirements are intended to be manually set by the user of the system and inputted to control unit 70. In addition, control unit 70 receives an input signal over line 83 which indicates the actual cooling output of the system. These signals can then be processed by control unit 70 to alter the cooling output of the system in a number of ways. For instance, control unit 70 could alter the flow of fuel to drive unit 38 via a valve 86, such as a conventional solenoid flow control valve, through a first electrical control line 88, adjust the field current in the generator/starter unit 56 via a second electrical control line 91 and/or control the operation of refrigerant compressor 8 via a third electrical control line 93 as will be discussed more fully below. Finally, FIG. 1 indicates that the products of combustion from gas generator/expander drive unit engine 38 are expelled from the system through exhaust line 97.

Figure 2:
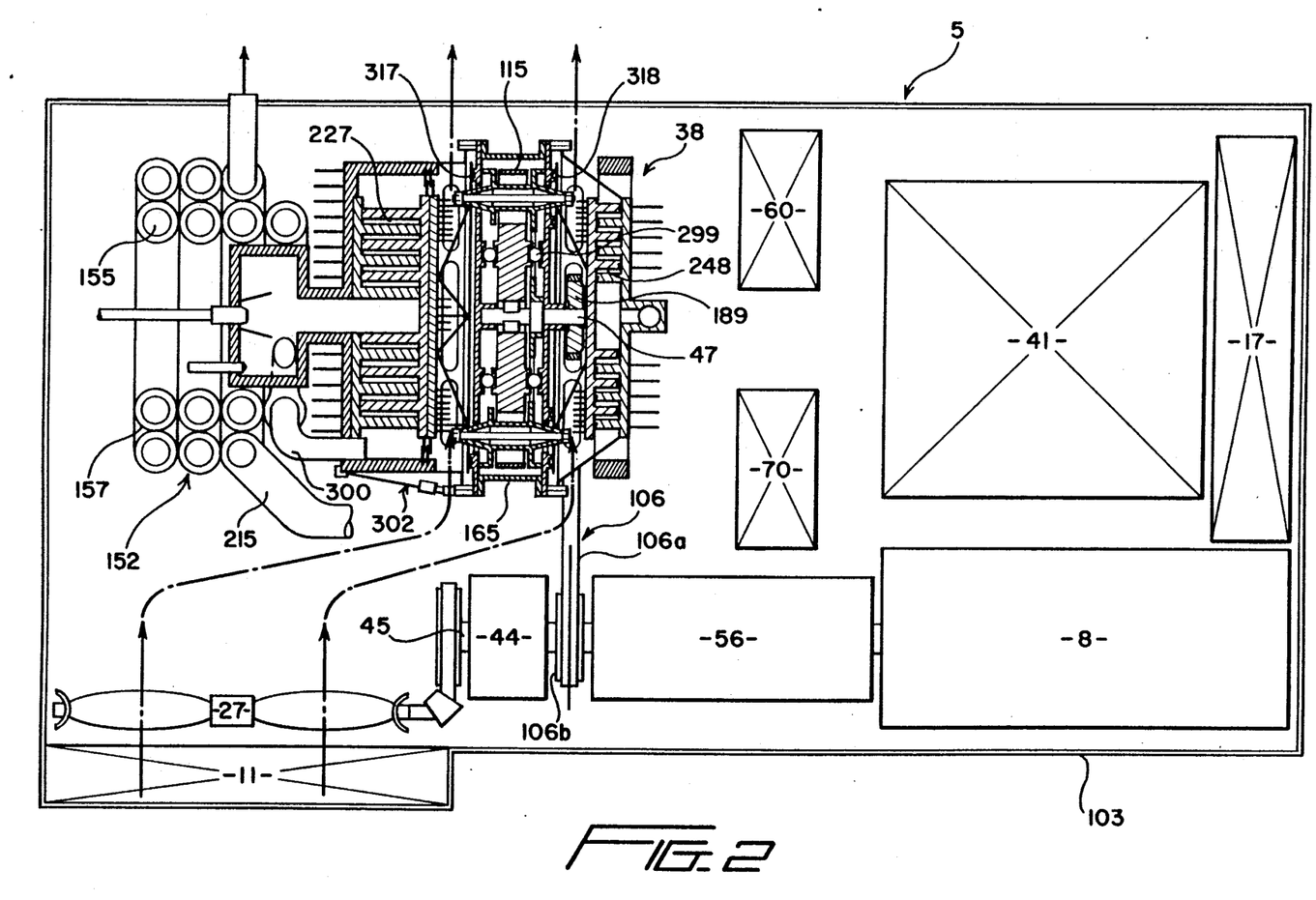
FIG. 2 depicts a schematic layout and arrangement of the portable power and cooling system within a support housing.

Reference will now be made to FIG. 2 which shows the preferred arrangement of the elements shown in FIG. 1 within a unitary housing 103. In order to aid in conceptualizing the actual size of the compact portable integrated power and cooling system of the present invention, the FIG. 2 arrangement depicts a reduction to 64% of the actual size of power and cooling system 5 in its preferred form. In addition, this figure also indicates that fuel pump 44, generator/starter unit 56 and refrigerant compressor 8 are adapted to be mounted upon a common drive shaft 45 which is interconnected to output shaft 47 through a power transfer assembly generally indicated at 106 including drive belt 106a and pulley 106b. This power transfer arrangement enables the length of housing 103 to be reduced, although it does increase its width. FIG. 2 also indicates that the air flow from fan unit 27 used to cool condenser 11 is also directed over the expander of drive unit 38 to provide a source of cooling for same. The specifics of power transfer assembly 106 and further details of this cooling arrangement for drive unit 38 will be more fully described hereinafter.

Figure 3:
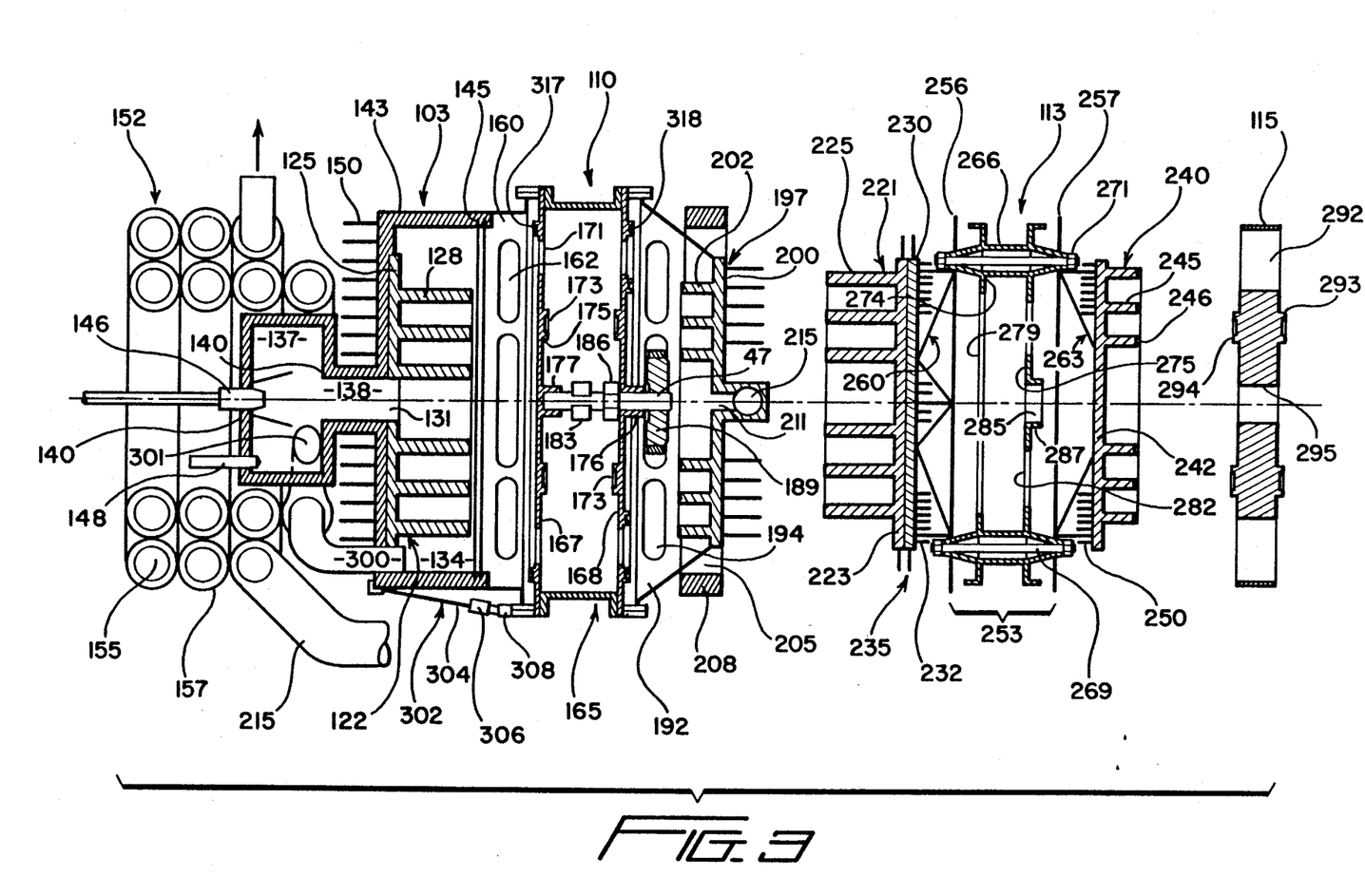
FIG. 3 depicts an exploded, partial cross-sectional view of the scroll-type gas generator, expander, air compressor and recuperator used in the portable power and cooling system of the present invention.

Reference will now be made simultaneously to FIGS. 2 and 3 in describing the particular structure of drive unit 38. Unit 38 includes a fixed central section 110 which is secured to housing 103, an orbiting scroll section 113 and a counterweight 115. Fixed section 110 includes a fixed expander scroll element 122 comprising a base plate 125 which supports an involute spiral scroll wrap 128. Fixed expander scroll element 122 includes a central inlet port 131 and a radially spaced, outlet zone 134. Engine 38 further includes a combustion chamber 137 which is in fluid communication with central inlet portion 131 of fixed expander scroll element 122 through an exhaust passage 138. Combustion chamber 137 is surrounded by a thermal insulation 140 (a high temperature insulation such as FIBERFRAX) which also lines exhaust passage 138, extends behind base plate 125 of fixed expander scroll element 122 and extends about side portions 143 of fixed section 110. Side portions 143 also have fixed thereto an annular labyrinth seal element 145 which will be more fully described below.

Combustion gas generator 137 is essentially a combustion chamber which receives fuel via second fuel line 53 through a fuel injector nozzle 146 for maintaining continuous combustion and discharging high temperature combustion gas. A glow plug 148 or other suitable ignition means also extends into combustion chamber of gas generator 137. In addition to the presence of thermal insulation 140, a plurality of cooling fins 150 are provided between gas generator 137 and fixed expander scroll element 122 to aid in dissipating heat generated during operation of gas expander drive unit 38. Intake air for combustion within the combustion chamber of gas generator 137 and exhaust of products of combustion are conducted through a recuperator heat exchanger generally indicated at 152. Recuperator 152 comprises elongated, coaxial coiled tubes, i.e. an inner tube 155 and an outer tube 157. As will be explained more fully below, outer tube 157 is used to direct the flow of combustion intake air into combustion chamber of gas generator 137 and inner tube 155 conducts the flow of spent combustion gas out of the scroll expander and housing 103, with the flows of intake air and combustion gas moving in counter current directions.

Fixed section 110 further includes a first annular plate 160 which includes a plurality of slots 162 through which cooling air from condenser cooling fan unit 27 is permitted to flow. Fixed section 110 further includes a central drive connecting unit 165 comprised of spaced walls 167, 168 each of which are provided with a plurality of circumferentially spaced holes 171 and an annular track 173 defined radially inward from circumferential spaced holes 171 by radially spaced, raised wall portions 175. Spaced walls 167 and 168 further include centrally located, aligned upstanding journals 176, 177 within which is rotatably mounted the output drive shaft 47 of drive unit 38. Output shaft 47 has fixedly secured or keyed thereto a first cam 183, a second cam 186, and a rotary output drive gear 189 as will be more fully discussed below.

Fixed section 110 further includes a second annular plate 192, which is directly analogous to first annular plate 160, having a plurality of slots 194 through which driving unit cooling air from fan 27 is permitted to flow to cool drive unit 38. Secured to second annular plate 192 is a fixed air compressor scroll element 197 comprising a base plate 200 which supports an involute spiral scroll wrap 202. Fixed air compressor scroll element 197 has associated therewith an annular inlet area 205 which is provided with a filter 208 and a central outlet port 211. Central outlet port 211 opens into a compressed air supply pipe 215 for use in supplying gas generator 137 with intake combustion air as will be discussed more fully below.

Orbiting scroll section 13 includes an orbiting scroll expander element 221 that comprises a base plate 223 and an involute spiral scroll wrap 225 which is adapted to mesh with involute spiral scroll wrap 128 so as to define at least one expansion chamber 227 (FIG. 2 only) that moves radially outward from adjacent central inlet port 131 to outlet zone 134. Secured to one side of base plate 223, opposite the side from which involute spiral scroll wrap 225 extends, is mounted a layer of thermal insulation 230 and a plurality of cooling fins 232. Furthermore, a labyrinth seal element 235 is secured about the annular periphery of base plate 223 for the reasons which will be more fully discussed below. Orbiting section 113 further includes an orbiting scroll air compressor element 240 comprising a base plate 242 and an involute spiral scroll wrap 245 which is adapted to be intermeshed with fixed spiral scroll wrap 202 of fixed compressor scroll element 197. Both involute spiral scroll wraps 202 and 245 include tip seals 246 which are carried by the ends of the involute spiral wraps 202, 245 and are adapted to engage the base plates 200 and 242 respectively so as to define at least one air compression chamber 248 (FIG. 2 only) that moves radially inward from annular inlet area 205 to central outlet port 211 in a manner known in the art of scroll compressors. A plurality of fins 250 may also be provided on a side of base plate 242, opposite involute spiral scroll wrap 245, to enhance the surface area of the unit for cooling purposes.

Orbiting scroll expander element 221 and orbiting scroll air compressor element 240 are fixedly secured to a central support frame 253, which includes a pair of spaced plate members 256, 257, by first and second truss structures 260 aid 263 respectively. Spaced plate members 256 and 257 are interconnected by a plurality of circumferentially spaced connecting tubes by means of a plurality of bolts 269 and nuts 271. By this construction, orbiting scroll expander element 221 and orbiting scroll air compressor element 240 are integrally connected to form a unitary structure. Therefore, orbiting of one of the scroll elements will also cause orbiting of the other scroll element.

Fixedly secured to or integrally formed with connecting tubes 266 is a pair of inner guide and support plates 274 and 275. Inner guide and support plate 274 includes an enlarged, central opening 279 (perhaps best shown in FIG. 2) while inner guide and support plate 275 includes a plurality of circumferentially spaced holes 282, located radially inward of the ends of inner guide and support plate 275, and a central hole 285. An annular upstanding flange 287 extends about central hole 285 for the reasons which will be more fully discussed below.

Counterweight 115 includes a plurality of concavities 292 spaced about the periphery thereof which are adapted to receive connecting tubes 266 as shown in FIG. 2, radially spaced inner and outer annular recess defining projections 293, 294 and a central through hole 295.

In the assembled condition as shown in FIG. 2, involute spiral scroll wrap 128 of fixed expander scroll element 122 intermeshes with involute spiral scroll wrap 225 of orbiting scroll expander element 221, involute spiral scroll wrap 202 of fixed compressor scroll element 197 intermeshes with involute spiral scroll wrap 245 of orbiting scroll compressor element 240, inner guide and support plates 274 and 275 are located between the spaced walls 167 and 168 and counterweight 115 is positioned between inner guide and support plates 274 and 275. First cam 183 extends into central through hole 295 of counterweight 115 while second cam 186 is concentrically mounted within upstanding flange 287 of inner guide and support plate 275. In addition, annular tracks 173, provided in spaced walls 167, 168 of central drive unit 165, are aligned with the recesses defined by annular projections 293 and 294 provided in counterweight 115. A plurality of balls 299 extend within these annular recesses to act as bearings and function as an anti rotation synchronizer for counterweight 115.

By this arrangement, when a charge is ignited within gas generator 137, the combustion gas is forced at a high energy level through passage 138 and into expansion chamber 227 through central inlet port 131. The force generated by the expanding high energy combustion gas will cause orbiting expander scroll element 221 to orbit relative to fixed expander scroll element 122. Orbiting of orbital expander scroll element 221 will also cause orbiting of orbital air compressor scroll element 240 through first truss structure 260, interconnecting tubes 266 and second truss structure 263. During this orbital movement, interconnecting tubes 266 orbit within circumferentially spaced holes 171 provided in spaced walls 167 and 168 of central drive unit 165. In addition, bearing balls 299, which are smaller than the recess formed in at least one of counterweight 115 or spaced walls 167, 168 of central drive unit 165, permit counterweight 115 to freely orbit relative to orbiting section 113. That is, counterweight 115 is specifically weighted and designed to orbit 180° out of phase with orbiting section 113 so as to counterbalance the forces developed during this orbiting movement. This 180° out of phase orbiting movement is accomplished by means of first and second cams 183, 186 on output shaft 47. More specifically, second cam 186 projects within central through hole 285 and is captured by annular flange 287 of inner guide and support plate 275 such that orbiting movement of orbital section 113 causes rotation of output shaft 47 through second cam 186. First cam 183, which, as previously stated, is also mounted upon and rotates with output shaft 47, is arranged 180° out of phase with cam 186. Therefore, orbital movement of orbital section 113 will result in orbital movement of counterweight 115 exactly 180° out of phase with section 113.

Orbital movement of orbiting compressor scroll element 240 relative to fixed scroll element 197 causes air to be drawn into inlet zone 205 through filter 208, compressed through compression chamber 248 and delivered to compressor outlet port 211. From outlet port 211, this compressed air is delivered to compressed air supply pipe 215 which extends into outer tube 157 of recuperator 152. In a similar manner, an exhaust pipe 300 extends from outlet zone 134 of the expander and is joined or integrally formed with inner tube 155 of recuperator 152. As shown in both FIGS. 2 and 3, exhaust pipe 300 extends into recuperator 152 at an innermost ring (not labeled). Exhaust pipe 300 enters this innermost ring and continues through the rings spirally outward until it projects out at the uppermost portion of the inner ring section remote from gas generator 137 at which point it is joined with the outermost ring of recuperator 152 and spirals inward towards combustion chamber 137 and exhausted as shown. On the other hand, inlet pipe 215 is first directed into the innermost outer loop of recuperator 152, spirals away from gas generator 137 into the outermost end of the inner loop of recuperator 152 and then spirals all the way inward and communicates tangentially with the combustion chamber of gas generator 137 through intake port 301 to thereby swirl the incoming air admitted to the combustion chamber to enhance combustion.

By this structure, recuperator 152 functions to recover thermal energy from the spent combustion gas and to use this energy to preheat the combustion air flowing into gas generator 137. This tube-in-a-tube configuration enhances heat exchange while enabling a compact arrangement. In the preferred embodiment, the outer tube has a 0.706 (1.79 cm.) inch outer diameter and a 0.020 inch (0.5 mm) wall thickness and the inner tube has a 0.531 (1.35 cm.) inch outer diameter and a 0.015 (0.38 mm) inch wall thickness. Wrapping of recuperator 152 in this two-layer spiral arrangement provides a total length of approximately 8.1 feet (2.47 m) along which the thermal heat transfer can be performed while still providing a relatively compact package. The spent combustion gas leaving recuperator 152 typically is discharged vertically upward out of housing 103 as best shown in FIG. 2 or in any other suitable direction, depending on the system configuration.

Referring again to both FIGS. 2 and 3, additional features and details of the scroll-type expander drive unit 38 will now be described. Since the air compressor connected to drive unit 38 is relatively insulated from high temperatures developed during combustion gas generation, the base plates 200 and 242 of the air compressor 13 along with involute spiral wraps 202 and 245 are preferably formed from a lightweight metal such as aluminum. Furthermore, since they are not subject to the extreme temperatures that the involute spiral wraps 128 and 225 of the expander are subject to, axial expansion and contraction is not a significant factor in the compressor and therefore tip seals 246 provide adequate sealing for the air compression chamber 248. On the other hand, the temperature within gas generator 137 can reach temperatures of approximately 1,900° F. (1038° C.) within which conventional tip seals (typically made of Teflon) would not survive. For this reason, no tip seals are utilized in the expander; however, the tip clearance is controlled by use of an axial micro-positioner generally indicated at 302. In the preferred embodiment, axial micro-positioner 302 comprises a cable 304 fixed at one end to either base plate 125 of fixed expander scroll element 122 or to housing 103 and a second end (not labeled) which has attached thereto an internally threaded nut member 306. Fixedly secured to spaced wall 167 of central drive unit 165 is an externally threaded member 308 upon which nut member 306 can be threaded. Various micro-positioners can be placed about the periphery of the expander in this manner. By this arrangement, the axial clearance between the tips of the involute spiral wraps 128 and 225 relative to base plates 125 and 223 respectively can be manually adjusted.

As best shown in FIG. 3, labyrinth seal element 235 is inter engaged with labyrinth seal element 145 attached to side portion 143 of drive unit 38 to effectively seal the exhaust gases within the expander side of unit 38. For lubrication purposes, central drive unit 165 includes volume for lubrication oil. This lubricating oil will be splashed around within central drive unit 165 by the orbiting elements. Only the central drive unit 165 is oil lubricated and is sealed by means of annular seals 317, 318 which bear against spaced plate members 256 and 257 respectively as best shown in FIG. 2.

Figures 4, 5:
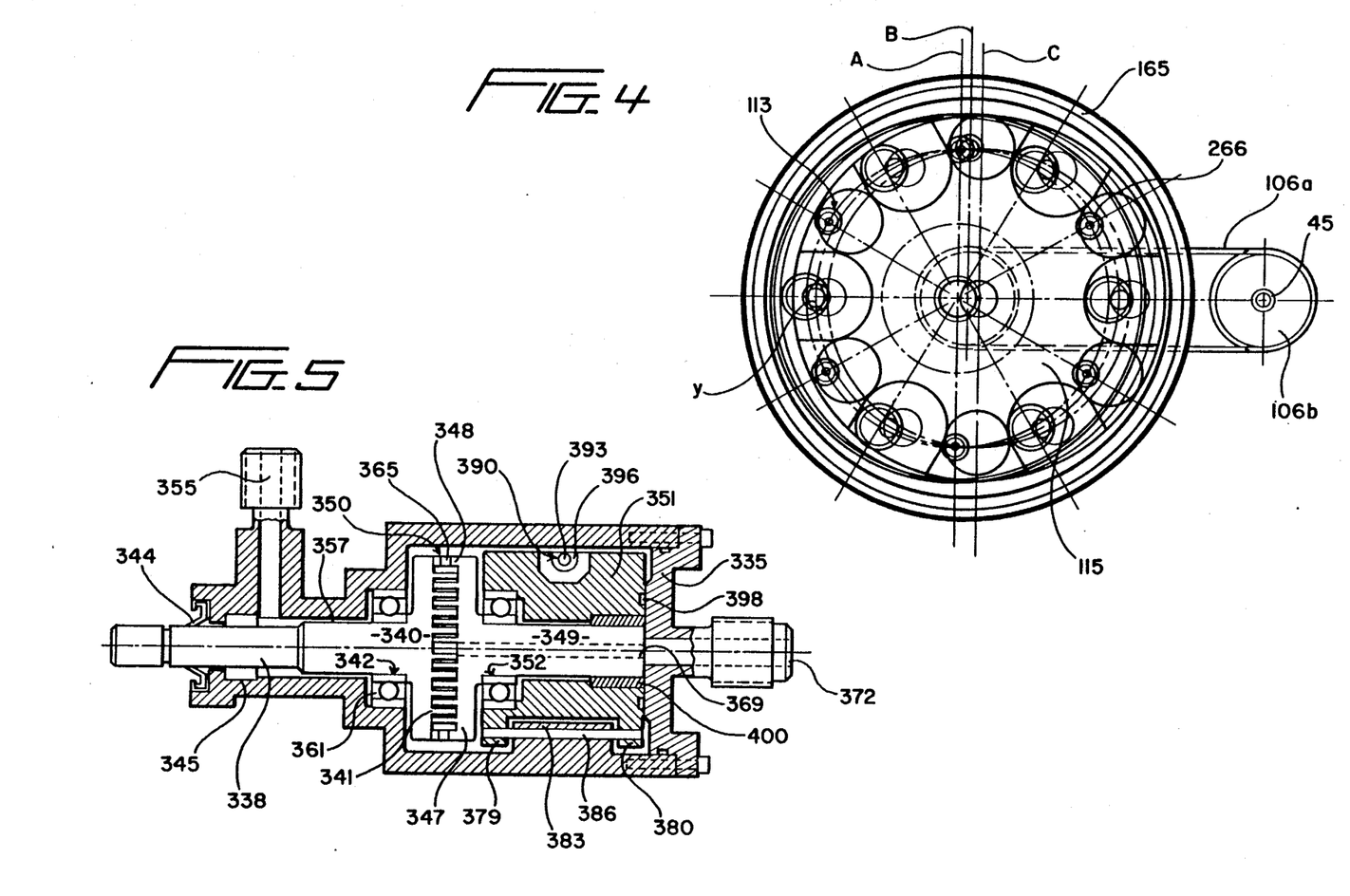
FIG. 4 shows the relative positioning of the scroll elements of the expander and air compressor in end view, along with the drive system between the expander and refrigerant compressor.
FIG. 5 is a partial cross-sectional view of a scroll-type refrigerant compressor useful in the present invention.

FIG. 4 shows the orbiting arrangement of orbiting scroll section 113 and counterweight 115 relative to fixed scroll section 110 along with the manner in which drive is taken from output shaft 47. Axis A depicts the axis of the orbiting scroll elements, axis B depicts the drive shaft axis, and axis C depicts the orbiting axis of counterweight 115. As can be seen by this arrangement, at any given instant, the center of the orbiting axis for the orbiting scroll members is 180° offset from the center of the orbiting counterweight 115 and the axis of drive shaft 47 is centrally positioned thereabout. Since drive shaft 47 is centrally positioned, rotary output motion of output gear 189 can be readily transmitted by means of a toothed belt or pulley system in order to drive the shaft upon which refrigerant compressor 8, fuel pump 44 and generator/starter unit 56 is mounted. Therefore, this power take-off structure constitutes the power transfer assembly 106 mentioned above.

As shown in FIG. 4, six rollers y spaced around the housing 165 fit within bearing bases in 167 and 168 and serve to carry the centrifugal loads from 113 and 115. These rollers counteract the opposed centrifugal loads with minimum friction.

As previously stated, FIG. 5 depicts a partial, cross-sectional view of a preferred embodiment for refrigerant compressor 8. As shown in FIG. 5, the compressor comprises a compressor housing 335 into which a compressor drive shaft 338 extends. Drive shaft 338 supports a co-rotating scroll element 340 having an involute spiral wrap 341. Drive shaft 338 and co-rotating scroll element 340 are rotatably mounted within housing 335 by means of bearings 342. A lip-type seal 344 is provided between housing 335 and drive shaft 338 to provide a seal there between. An additional bearing member 345 supports the outboard end of shaft 338.

A second co-rotating scroll element 347 having an involute spiral wrap 348 which meshes with involute spiral wrap 341 of scroll element 340 is also provided within housing 335. Scroll elements 340 and 347 are mounted for rotation about parallel but offset axes within housing 335 such that, although both scroll elements 340 and 347 co-rotate, they also orbit relative to each other. Relative rotation between the scroll elements is prevented by utilizing a synchronizer generally indicated at 350 at the periphery of the scrolls, for example as exemplified in U.S. Pat. No. 4,927,340.

Further located within housing 335 is a movable bearing support block 351 within which shaft 349 of scroll element 347 is rotatably mounted by means of bearings 352. The specific manner in which block 351 is mounted within compressor housing 335 will be more fully described below. Compressor housing 335 includes a housing inlet 355 for the introduction of a refrigerant. The refrigerant flows from housing inlet 355 through a clearance 357 between shaft 338 and housing 355, through a passage 361 in bearings 342 and into an outer inlet 365 at the synchronizer 350. As is known in the art, the relative orbital movement between scroll elements 340 and 347 will function to compress the refrigerant between the scrolls which will then be directed to a central outlet 369 formed in shaft 349. Central outlet 369 is aligned with a housing outlet 372 which is connected to condenser 11 in the manner described with reference to FIG. 1 above.

The specific manner in which block 351 is mounted within housing 335 will now be described. Block 351 is integrally formed with a pair of spaced flanges 379, 380 between which a projection 383, integrally formed with housing 335, extends. A pivot rod 386 extends through an aligned bore (not labeled) formed in flanges 379, 380 and projection 383. Therefore, block 351 is permitted to slightly pivot laterally within compressor housing 335 about pivot rod 386. Pivoting of block 351 adjusts the distance between the flanks of involute spiral wraps 341 and 348 in order to load or unload air conditioning compressor 8. Adjustment of housing 351 can be performed by means of a block position adjustment mechanism generally indicated at 390. In the preferred embodiment, adjustment mechanism 390 includes an externally threaded screw 393 which can be either manually rotated or controlled by means of a motor (not shown) controlled via electrical line 93 of control unit 70. Screw 393 extends within a threaded bore 396 formed in block 351. Therefore, rotation of screw 393 will function to pivot block 351 about pivot rod 386. Further provided within housing 335 is an annular seal 398 (preferably made of Teflon) which extends between block 351 and housing 335 to restrict the flow of coolant between these two elements and a journal bearing member 400 which is positioned between shaft 349 and block 351 to stabilize rotation of shaft 349.

Based on the above description, it can readily be seen that the power and cooling system of the present invention provides an integrated, compact system for producing cooling air and supplemental electrical power that is readily portable. The amount of cooling and electrical output would depend upon the user's instantaneous requirements which would be inputted to control unit 70 at 77 and 80 as discussed above. In the preferred embodiment, all of the above-discussed components are integrated into an enclosed package that is suitable for carrying on a backpack. In a preferred embodiment, the weight of the portable units would be under eight pounds. In this embodiment, the drive unit 38 could operate on either liquid or gaseous fuels (preferably JP8/DF$_2$), would have an electrical output of 78 Watts maximum or 35 Watts average at 24 to 28 volts DC and could provide a cooling effect of approximately 400 Watts at intervals of 15 minutes per hour or 150 Watts average. In order to accomplish this function, the drive unit according to the preferred embodiment would have a 500 Watt output, would be designed to rotate at 15,000 rpm, operate at a pressure ratio of approximately 4:1 which would enable good scroll compressor and expander efficiencies without mandating excessive sealing requirements, would operate with an expander inlet temperature of approximately 1500° F. (816° C.) and have a brake specific fuel consumption of approximately 0.6 to 0.9 lbs./Horsepower Hour. The cooling system would preferably operate on refrigerant R-12 or equivalent in the standard refrigeration mode. The capacity of the system would depend upon compressor speed and would range from approximately 546 BTU/hr. (160 W) to 1,365 BTU/hr. (400 W) at speeds of 6,000 and 15,000 rpm of the drive unit respectively. In addition to the R-12 refrigerant, a small amount of 3-GS refrigeration system lubricating oil or other appropriate lubricant may also be provided in the system as is common with conventional automotive air conditioning systems. Of course, these specifications could be readily changed with a general corresponding change in the overall size of the system depending upon the desired environment or field of use for the system.

Although described with respect to a particular embodiment of the invention, it is to be understood that various changes and/or modifications can be made to the present invention by a person skilled in the art without departing from the spirit of the invention. For instance, although an electrical generator/starting unit is disclosed, it would be possible to start the engine by various other means such as using an electric motor drive which engages the output shaft and is powered by the on-board battery in a manner similar to some lawn mowers currently on the market, or a pneumatic starting system may be utilized which would use externally pressurized gas using a pressurized air source or a small, propellant charge. Also, the drive transfer system between the expander output shaft and the refrigerant compressor could be different, using different drive transfer components known to those skilled in drive systems. In general, the invention is only intended to be limited by the scope of the following claims.

I claim:

1. A portable power and cooling system comprising:
a drive unit including a combustion section, a scroll-type expander section, a scroll-type air compressor section, and a power output drive shaft, said expander and air compressor sections connected together for synchronous movement via said power output drive shaft; said combustion section including a combustion air inlet and a combustion gas outlet, said scroll-type expander section including at least one pair of meshed axially extending involute spiral wrap members having involute centers and defining at least one expansion chamber between them that moves radially between an expander inlet zone, which is in fluid communication with the combustion gas outlet, and an outlet zone when one wrap member is orbited along a circular path about an orbit center relative to the other wrap member, said scroll type air compressor section including at least one pair of meshed axially extending involute spiral wrap members having involute centers and defining at least one compression chamber between them that moves radially between a compressor inlet zone and an outlet zone, which is in fluid communication with the combustion air inlet of the combustion section, when one wrap member is orbited along a circular path relative to the other wrap member about an orbit radius, said drive connecting unit integrally connecting said one wrap member of each of said scroll-type expander and air compressor sections;
means for causing combustion within said combustion chamber such that the products of combustion flow from said combustion chamber, through said combustion gas outlet and into said expander inlet zone, into said at least one expansion chamber to cause said one wrap member of said scroll-type expander section to orbit along with said one wrap member of said scroll-type compressor section such that the products of combustion are expanded by said scroll-type expander section and exhausted out said expander outlet, air is drawn into said air compressor inlet zone, compressed within said at least one compression chamber, expelled through said air compressor outlet zone, and delivered to said combustion chamber and said power output shaft is rotated;

a refrigeration system including a refrigerant compressor connected in drive relationship with the output drive shaft, a refrigerant condenser, a refrigerant expansion valve and a refrigerant evaporator, and a conduit containing a refrigerant in fluid communication with the compressor, condenser, expansion valve, and evaporator.

2. A cooling system as claimed in claim 1, including a cooling conduit means in heat exchange communication with said evaporator and a cooling zone spaced away from said evaporator, said conduit arranged to supply a coolant from the evaporator location to the cooling zone location.

3. A cooling system as claimed in claim 2, said cooling conduit means comprising a closed loop conduit containing a coolant and extending from the evaporator to the cooling zone and back to the evaporator in a closed loop.

4. A cooling system as claimed in claim 3, including means for circulating a coolant in said closed loop conduit.

5. A cooling system as claimed in claim 1, including a drive connecting unit, wherein said drive connecting unit includes first and second spaced plates to which said one wrap member of each of said scroll-type expander and compressor sections are respectively attached.

6. A cooling system as claimed in claim 5, further including first and second truss structures for respectively attaching said one wrap member of each of said scroll-type expander and compressor sections to said first and second spaced plates.

7. A cooling system as claimed in claim 5, further including a counterweight located between said first and second spaced plates, said counterweight being drivingly connected to said power output drive shaft so as to orbit 180° out of phase with said scroll-type expander and compressor sections.

8. A cooling system as claimed in claim 1, further including an axial positioner means adjustably and operatively interconnected between the involute spiral wrap members of said scroll-type expander section for adjusting the axial distance between the involute wrap members.

9. A cooling system as claimed in claim 8, wherein said axial positioner comprises a first threaded member operatively secured to one of said involute spiral wrap members of said scroll-type expander section and a second threaded member operatively secured to the other of said involute spiral wrap members of said scroll-type expander section, said first threaded member being threadably connected to said second threaded member to enable adjustment of the permissible axial distance between said involute spiral wrap members when rotated.

10. A cooling system as claimed in claim 1, further including combustion air heat exchanger means for transferring a portion of the thermal energy from the spent products of combustion of said drive unit to the combustion air delivered to said combustion chamber.

11. A cooling system as claimed in claim 1, further including a housing, a fuel tank, a fuel pump for delivering fuel from said fuel tank to said combustion chamber, a battery and a generator/starter unit for use in starting said drive unit with power supplied from said battery and for producing electricity during operation of said drive unit, said fuel tank, pump, battery, generator/starter unit all being connected to said housing.

12. A cooling system as claimed in claim 11, wherein said fuel pump, said generator/starter unit and said refrigerant compressor are driven by said drive unit via said power output drive shaft.

13. A cooling system as claimed in claim 1, further including means for controlling the amount of cooling output from the cooling system, said controlling means including means for inputting temperature control command signals and for sensing the cooling output of the system, and for generating a cooling adjustment signal for adjusting the cooling output of the system.

14. A cooling system as claimed in claim 13, wherein said controlling means comprises means for regulating the supply of fuel to said drive unit.

15. A cooling system as claimed in claim 11, including means for controlling the amount of cooling output from the cooling system, said controlling means including means for inputting temperature control command signals and for sensing the cooling output of the system and for generating a cooling adjustment signal for adjusting the cooling output of the system.

16. A cooling system as claimed in claim 15, wherein said controlling means comprises means for adjusting the field current in said generator/starter unit.

17. A cooling system as claimed in claim 13, wherein said controlling means comprises means for altering the compressing capacity of said refrigerant compressor.

18. A cooling system as claimed in claim 17, wherein said refrigerant compressor comprises a pair of intermeshed, relatively orbiting, co-rotating scroll compressor elements rotatably mounted within a compressor housing about paralleled but offset axes of rotation and wherein said means for altering the compressing capacity of said refrigerant compressor comprises means for adjusting the distance between said axes of rotation.

19. A cooling system as claimed in claim 1, wherein said pair of axially extending involute spiral wrap members of said scroll-type air compressor section are formed from aluminum.

20. A cooling system as claimed in claim 1, further including a drive connecting unit, and a labyrinth-type seal operatively located between said scroll-type expander section and said drive connecting unit to contain the products of combustion of said engine unit within said scroll-type expander section.

21. A cooling system as claimed in claim 1, further including thermal insulation means for thermally insulating at least said combustion section and said expander section.

22. A cooling system as claimed in claim 1, including a fixed system housing, and wherein said other wrap member of each of said scroll-type expander and air compressor sections are fixed with respect to said system housing.

* * * * *